Jan. 22, 1963    J. R. ROSENLEAF    3,074,530
BOARD INVERTER
Filed Dec. 23, 1959    3 Sheets-Sheet 2
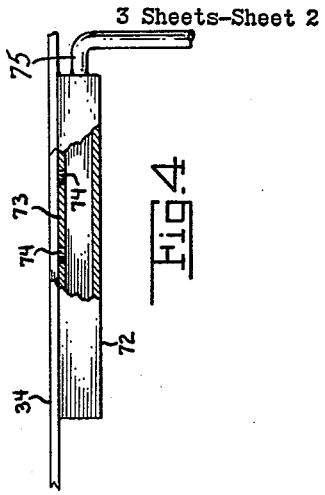
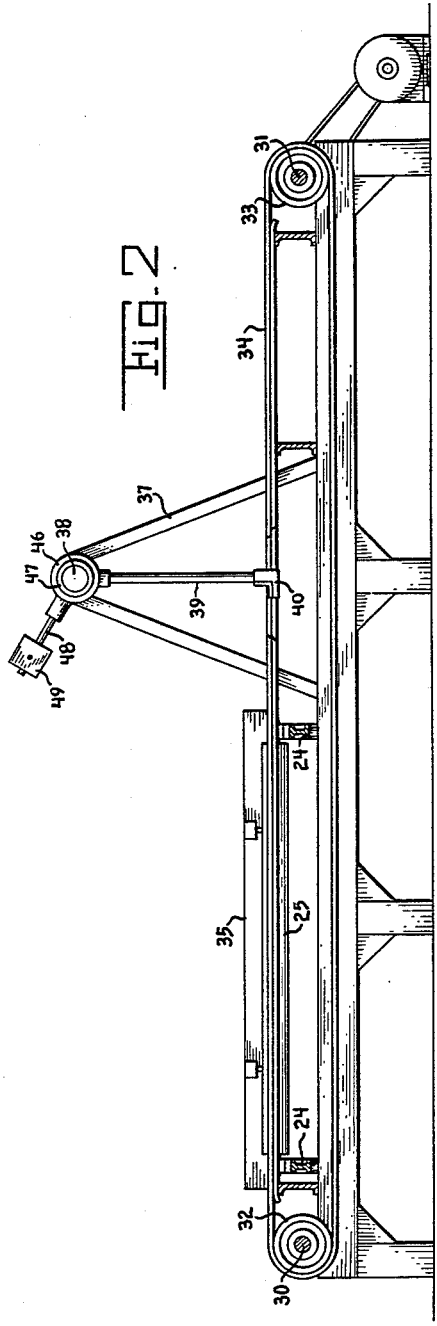
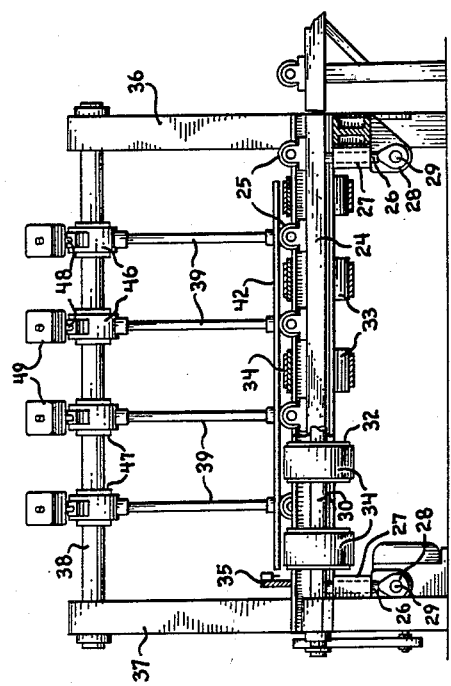
INVENTOR.
JOHN R. ROSENLEAF
BY
Harold B. Hood
ATTORNEY

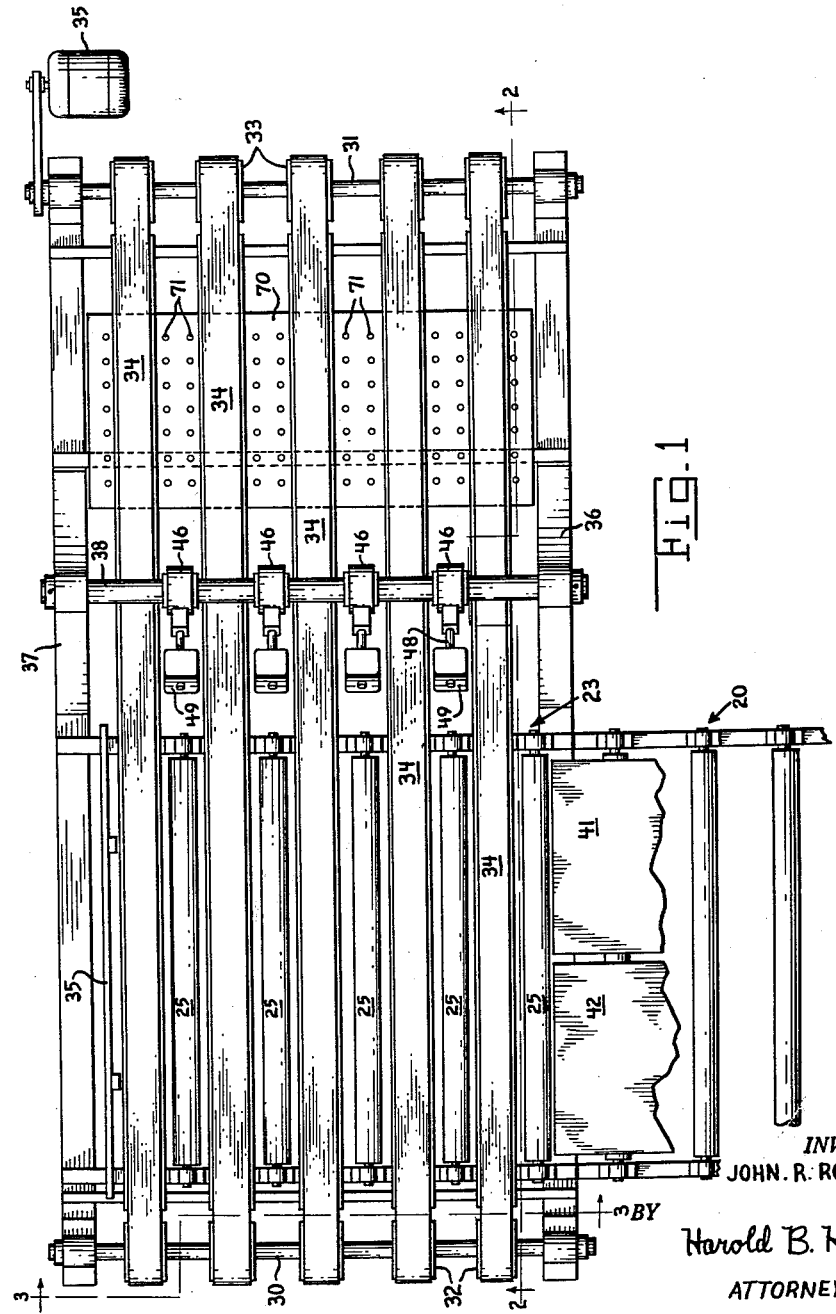

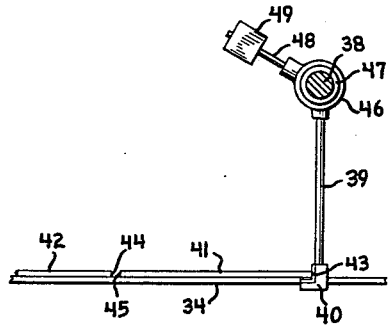
Fig.5
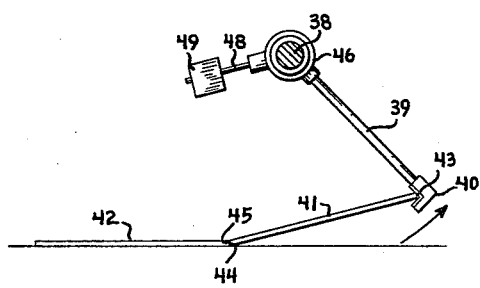
Fig.6
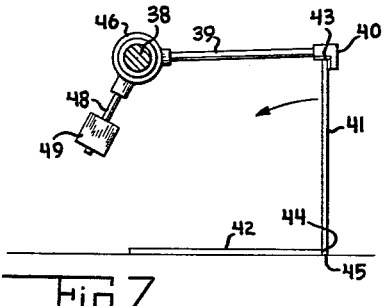
Fig.7
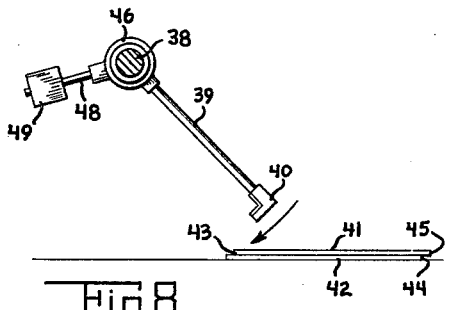
Fig.8
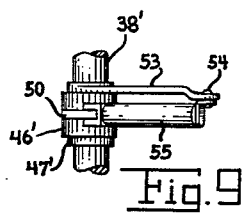
Fig.9
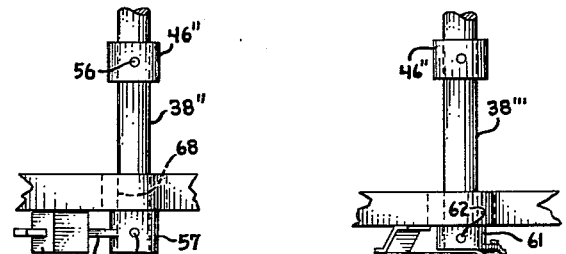
Fig.11    Fig.13
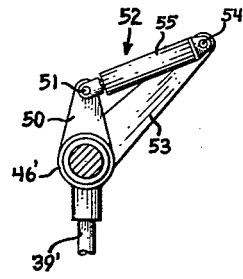
Fig.10
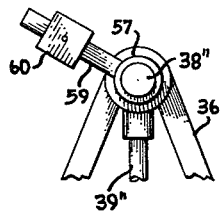
Fig.12
Fig.14
INVENTOR.
JOHN R. ROSENLEAF
BY
Harold B. Hood
ATTORNEY United States Patent Office 3,074,530
Patented Jan. 22, 1963

3,074,530
BOARD INVERTER
John R. Rosenleaf, Enterprise, Kans., assignor to The J. B. Ehrsam & Sons Manufacturing Company, Enterprise, Kans., a corporation of Kansas
Filed Dec. 23, 1959, Ser. No. 861,487
10 Claims. (Cl. 198—33)

The present invention relates to a mechanism for inverting sheets of board-like material, and is primarily designed for use in connection with plaster board, fiber board, wood panels and the like. In handling plaster board, for instance, whose "face surface" and "back surface" are ordinarily of different characteristics, it is customary to "book" the sheets in pairs with their face surfaces in contact with each other, whereby those surfaces are protected against soiling, blemishes and scuffs. One object of the present invention, then, is to provide simple, inexpensive and foolproof mechanism for automatically inverting alternate plaster boards into face-to-face relation with intermediate boards being fed from a board-making machine.

In other cases, it may be desirable to invert each board as it comes from the production line. Plaster board is ordinarily made with the face side down, and it is frequently preferred to run the board through the drier with the face side up to protect that surface from soiling or damage within the drier. A further object of the present invention, then, is to provide mechanism of such character that, when properly adjusted and operated, it will so invert every board fed to it.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 1 is a plan view of an inverter mechanism constructed in accordance with the present invention, showing a fragment of the conveyor means whereby boards are conducted from the manufacturing machine to the inverter;

FIG. 2 is a section taken substantially on the line 2—2 of FIG. 1;

FIG. 3 is a section taken substantially on the line 3—3 of FIG. 1;

FIG. 4 is a fragmentary elevation, partly in section, of an optional detail;

FIGS. 5, 6, 7 and 8 are somewhat diagrammatic views illustrating successive positions of the parts in operation;

FIG. 9 is a fragmentary plan of a modified form of suspension for the arrestor bars;

FIG. 10 is a fragmentary elevation thereof;

FIG. 11 is a fragmentary plan of another form of suspension for the arrestor bars;

FIG. 12 is a fragmentary elevation thereof;

FIG. 13 is a fragmentary plan of still another form of suspension for the arrestor bars; and FIG. 14 is a fragmentary elevation thereof.

Referring more particularly to FIGS. 1, 2 and 3, it will be seen that I have suggested delivery means, such as, for instance, a live roll conveyor indicated generally by the reference numeral 20 for delivering boards from a source of supply, such as, for instance, a plaster board making machine, to a further live roll conveyor indicated generally by the reference numeral 23. The conveyors 20 and 23 may be continuously or intermittently driven by any suitable means (not shown).

The live roll conveyor 23 comprises a bed 24 upon which are journalled a series of rolls 25, said bed being supported for reciprocation upon four or more pins 26 each of which is reciprocably guided in a fixed sleeve 27 carried by the stationary frame of the machine. Each pin 26, in turn, is supported upon a cam 28 mounted for oscillation about a fixed axis 29, the construction being such that, when the cams are in the positions illustrated in FIG. 3, the uppermost surfaces of the rolls 25 will lie substantially in the plane of the uppermost surfaces of the rolls of the conveyor 20.

Arranged adjacent one edge of the bed 24 is a shaft 30, and a mating shaft 31, parallel with the shaft 30, is spaced a substantial distance from the opposite edge of the bed 24. The shaft 30 carries a plurality of axially spaced pulleys 32, the shaft 31 carries a similar series of pulleys 33, and an endless belt 34 is trained over each pair of pulleys 32, 33. The series of belts 34 thus comprises a transversely-interrupted conveyor means, the upper runs of said belts being located substantially in a common horizontal plane. Means such as the motor 35 is provided for driving the upper runs of all of the belts unidirectionally at a common velocity.

As is clearly to be seen in FIG. 3, when the bed 24 is in its illustrated position, the common plane tangent to the rollers 25 is disposed above the common plane of the upper runs of the belts 34; but when the cams 28 have been turned approximately 90° from their illustrated positions, the bed 24 will have been lowered to a position in which the common plane tangent to the rollers 25 is below the plane of the upper runs of the belts 34.

A-frames 36 and 37 are positioned adjacent the opposite edges of the conveyor which comprises the belts 34 to carry a support 38, located above the upper runs of the belts 34 and spanning the entire series of belts. In the illustrated embodiment of the invention, a plurality of arrestor arms 39 are suitably suspended from the support 38, in registry with the spaces between the belts 34, to swing about the axis of the support 38. Each such arm is provided with hook means 40 which, when the arms are in substantially vertical dependent position, are disposed immediately below the plane common to the upper runs of the belts 34, as is most clearly illustrated in FIG. 2.

When boards are to be booked in pairs, in the manner above described, two such boards 41 and 42 will be carried together on the conveyor 20 and will be substantially concurrently delivered to the rolls 25 in side-by-side, slightly spaced relation, as suggested in FIG. 5. The two boards will be carried, by the rolls 25, upwardly as viewed in FIG. 1 till their leading edges strike the stop 35. In some installations, the element 35 may be movable to control switch mechanism acting, when the boards engage said stop, to cause the cams 28 to be rotated to permit the bed 24 to drop. In other installations, those cams may be arranged for manual actuation. At any rate, when the boards 41 and 42 have been brought into engagement with the stop 35, the bed 24 will be lowered to deposit the boards, in the above-mentioned side-by-side relation, on the belts 34, the upper runs of which are continuously travelling toward the right as viewed in FIGS. 1 and 2. The arms 39 being in vertical dependent position, as the boards travel on the belts 34, the leading edge 43 of the board 41 will engage the hooks 40 of the arms 39. Since the arms 39 are free to swing, in a counter clockwise direction, about the axis of the support 38, continued travel of the board 41 with the belts 34 will swing the arms 39 in such a counterclockwise direction, whereby the hooks 40 will begin to rise, as indicated in FIG. 6; and, since the edge 43 of the board 41 is engaged by the hooks 40, said board edge will rise with the hooks. As the board 41 tilts, its area of frictional engagement with the belts 34 is decreased, and its trailing edge 45 will tend to slide upon the belts until the leading edge 44 of the companion board 42 engages the edge 45 of the board 41, whereafter said board edge 45 will continue to travel with the belts 34. Eventually, the parts will attain the positions of FIG. 7, in which the board 41 is substantially vertical; and as the board 42 continues to travel toward the right, carrying with it the edge 45 of the board 41, the board 41 will be overbalanced and will fall, in the direction suggested by the arrow in FIG. 7, into face-to-face relation with the board 42, as illustrated in FIG. 8.

Preferably, but not necessarily, the axis of the support 38 will be spaced above the plane of the upper runs of the belts 34 by a distance equal to the dimension of the board 41 taken in the direction of movement of said belt runs, so that the arms 39 will be substantially horizontal when the board, so overbalanced, begins to fall away from the arms.

Of course, as the edge 43 of the board 41 begins to fall away from the hooks 40 of the arms 39, said arms will likewise tend to fall, in a clockwise direction about the axis of the support 38. It is desirable to retard the fall of the arms 39 in order that the inverted board may move beyond the path of the hooks 40, without being scraped or struck by said hooks, as they fall; and, in the form of invention illustrated in FIGS. 1 to 8, that function is accomplished by the provision of a counterweight for each arm 39.

In that form of the invention, the support 38 is a rod which is held against rotation about its own axis, and each arm 39 is fixedly carried by a ring 46 supported, through an anti-friction bearing 47, from the support 38. Thus the several arms 39 are independently swingable so that, if shorter boards are fed to the machine, only those arms which are actually engaged by an advancing board will be moved during an inverting operation. A supplemental arm 48 is fixed to each ring 46, preferably at an angle of about 120° with respect to the arm 39, and a counterweight 49 is carried upon each arm 48.

Obviously, the machine will be so timed that the arms 39 will return to vertical, dependent position to be engaged by the leading edge 43 of the board 41 of the next pair fed to the belts 34 by the conveyor 20.

A modified form of retarding means for the arrestor arms is shown in FIGS. 9 and 10. In that form, each arm 39' is caried by a ring 46' mounted, through an anti-friction bearing 47', upon the fixed support 38', and each such ring carries an arm 50 to which is pivotally connected, at 51, the plunger of a pneumatic or hydraulic check device, indicated generally by the reference numeral 52. Fixed with respect to the support 38' is an arm 53 to which is pivotally connected, as at 54, the cylinder 55 of the check device 52. The device 52 may be similar to a door check or a speed regulating cylinder for machine tools, such devices being well known in the art and therefore being only diagrammatically illustrated herein. It will be understood, of course, that the plunger of the device 52 is freely movable outwardly with respect to the cylinder 55, but is returnable into the cylinder only with a dash pot effect. Thus, as each arm 39' is moved in a counter-clockwise direction under the action of the advancing board, the associated arm 50 is freely swingable to withdraw the plunger from the cylinder 55; but the rate of return of each arm 39', in a clockwise direction, is regulable by adjustment of the associated check device 52.

In FIGS. 11 and 12, I have illustrated a support 38" which is mounted for rotation about its own axis in anti-friction bearings 68. In this form of the invention, each arm 39" is carried by a ring 46" which is adjustably fixed with respect to the support 38" and, for instance, by a set screw 56, so that the arms 39" are movable only in unison as the support 38" turns about its axis. Fixed to at least one end of the support 38" is a ring 57, adjustably secured to said support by a set screw 58 or the like, said ring 57 carrying an arm 59 upon which is mounted a counterweight 60. Thus, as the hooks of the arms 39" are engaged by the advancing board edge, the arms and the support 38" will be turned in a counter-clockwise direction until the advancing board is overbalanced, whereafter the arms 39" will return to vertically dependent position, being retarded in such return by the counterweight or weights 60.

In FIGS. 13 and 14, I have shown a similarly oscillable support 38''' to which the rings 46" are similarly secured. In this form of the invention, a further ring 61 is secured to at least one end of the shaft 38''', by a set screw 62 or the like, and said ring carries an arm 63 to which is pivotally connected, as at 64, the plunger of a check device indicated generally by the reference numeral 65. The cylinder 66 of the check device 65 may be pivotally connected, as at 67, to the frame element 36. Thus, as the shaft 38''' turns in a counter-clockwise direction under the influence of a travelling board in engagement with the arm hooks, the piston of the check device 65 will be freely withdrawn from the cylinder 66; but the check device will retard the return of the shaft 38''' as the arms fall after the engaged board has overbalanced.

Obviously, if it is desired to invert every board which passes the inverting mechanism, boards will be fed to the rollers 25 singly, instead of in pairs, and the spacing between boards so fed will be such as to permit return of the arms 39 to vertically dependent position before the next board in succession reaches the inverting station. For such service, it may be necessary or advisable to provide spaced cleats on one or more of the belts 34, or to use belts 34 having rough-patterned friction surfaces, to ensure travel of the trailing board edges after the leading edges of the boards have been lifted away from the belts.

Particularly where each board is thus to be inverted, it is sometimes desirable to provide a cushioning platform 70, immediately below the upper runs of the belts 34, in the region just to the right of the support 38 as viewed in FIGS. 1 and 2, onto which the inverted boards will fall. As shown in FIG. 1, such a platform may comprise a simple plate, formed with plural openings or ports 71 therethrough. It is found that the provision of such a perforated platform assists in avoiding breaking or cracking of the falling boards, and is particularly valuable if the board is in a soft condition.

In FIG. 4, I have shown a modified form of cushioning platform which may comprise a box or housing 72, the upper wall 73 of which is formed with a plurality of ports 74. Compressed air may be supplied to the interior of the box 72, as through a suitable conduit 75 leading from a source (not shown) of air under pressure, so that air jets are directed upwardly through the ports 74.

I claim as my invention:

1. A board-inverter mechanism comprising laterally-interrupted means for supporting and moving a board substantially horizontally, fulcrum means disposed above said board-moving means and transverse to the direction of movement of such a board, said board-moving means continuing substantially horizontaly for a significant distance beyond the location of said fulcrum means, and an arm dependent substantially vertically from said fulcrum means and mounted for oscillatory swinging movement about the axis of said fulcrum means, said arm being provided with hook means disposed below the advancing path of the leading edge of a board carried by said board-moving means and below the plane of said board-moving means.

2. A board-inverter mechanism comprising means for supporting and moving a board substantially horizontally, fulcrum means disposed above said board-moving means and transverse to the direction of movement of such a board, an arm dependent from said fulcrum means and mounted for oscillatory swinging movement about the axis of said fulcrum means, said arm being provided with hook means disposed in the advancing path of the leading edge of a board carried by said board-moving means, the parts being so proportioned and arranged that continuing movement of a board by said board-moving means after engagement with said hook means swings said arm in the direction of such movement and upwardly about such fulcrum means axis, said hook means carrying said board edge upwardly therewith until said board is overbalanced, and means operatively associated with said arm and acting to retard the return of said arm to dependent position.

3. A board-inverter mechanism comprising a movable conveyor having an advancing run disposed substantially horizontally, a support located above said conveyor run upon a substantially horizontal axis transverse to the direction of movement of said conveyor run, said conveyor, extending horizontally for a significant distance beyond the location of said support, a plurality of arms, spaced along the length of said support, and suspended therefrom for oscillatory swinging movement about the axis of said support, each of said arms being provided with hook means disposed, when said arm is in substantially vertical dependent position, immediately below the plane of movement of said advancing conveyor run for engagement by the leading edge of a board moving on said run, and said arms being swingable, under the influence of such a board, forwardly and upwardly to lift said leading board edge and to invert said board.

4. A board-inverter mechanism comprising a movable conveyor having an advancing run disposed substantially horizontally, a support located above said conveyor run upon a substantially horizontal axis transverse to the direction of movement of said conveyor run, a plurality of arms, spaced along the length of said support, and suspended therefrom for independent, oscillatory swinging movement about said support, each of said arms being provided with hook means disposed, when said arm is in substantially vertical dependent position, immediately below the plane of movement of the leading edge of a board moving on said conveyor run and below the plane of said run, and said arms being swingable, when engaged by such a leading board edge, forwardly and upwardly to lift said leading board edge and to invert said board.

5. A board-inverter mechanism comprising a movable conveyor having an advancing run disposed substantially horizontally, a support located above said conveyor run and mounted for oscillation about a substantially horizontal axis transverse to the direction of movement of said conveyor run, a plurality of arms, spaced along the length of said support, and fixedly suspended therefrom, each of said arms being provided with hook means disposed, when said arm is in substantially vertical dependent position, immediately below the plane of movement of the leading edge of a board moving on said conveyor run, and said arms being swingable, under the influence of such a board, forwardly and upwardly to lift said leading board edge and to invert said board.

6. A board-inverter mechanism comprising a movable conveyor having an advancing run disposed substantially horizontally, a support located above said conveyor run upon a substantially horizontal axis transverse to the direction of movement of said conveyor run, a plurality of arms, spaced along the length of said support, and suspended therefrom to swing about the axis of said support, each of said arms being provided with hook means disposed, when said arm is in substantially vertical dependent position, immediately below the plane of movement of the leading edge of a board moving on said conveyor run, and said arms being swingable, under the influence of such a board, forwardly and upwardly to lift said leading board edge and to invert said board, and means operatively associated with said arms and acting to retard the return thereof, from lifted position, toward such vertical dependent position.

7. A board-inverter mechanism comprising a movable conveyor having an advancing run disposed substantially horizontally, a support located above said conveyor run upon a substantially horizontal axis transverse to the direction of movement of said conveyor run, a plurality of arms, spaced along the length of said support, and suspended therefrom to swing freely and independently about said support, each of said arms being provided with hook means disposed, when said arm is in substantially vertical dependent position, immediately below the plane of movement of the leading edge of a board moving on said conveyor run, said arms being swingable, when engaged by such a leading board edge, forwardly and upwardly to lift said leading board edge and to invert said board, and means operatively associated with each of said arms and acting to retard return of such arm, from lifted position, toward such vertical dependent position.

8. A board-inverter mechanism comprising a movable conveyor having an advancing run disposed substantially horizontally, a support located above said conveyor run and mounted for oscillation about a substantially horizontal axis transverse to the direction of movement of said conveyor run, a plurality of arms, spaced along the length of said support, and fixedly suspended therefrom, each of said arms being provided with hook means disposed, when said arm is in substantially vertical dependent position, immediately below the plane of movement of the leading edge of a board moving on said conveyor run, said arms being swingable, under the influence of such a board, forwardly and upwardly to lift said leading board edge and to invert said board, and means operatively associated with said support and acting to retard oscillation thereof in a direction to return said arms, from lifted position, toward such vertical dependent position.

9. A board-inverter mechanism comprising a plurality of laterally-separated, endless conveyor elements, each having an upper run, said upper runs being disposed substantially in a common, generally-horizontal plane, a support located above said plane upon a substantially horizontal axis spanning said runs, a plurality of arms suspended from said support to swing about said axis and registering, respectively, with the spaces between said endless elements, each of said arms being provided with hook means disposed, when said arms are substantially vertically dependent from said support, immediately below said common plane, means for driving said endless elements unidirectionally at a common velocity past said support, and perforated platform means closely underlying said common plane and spanning the spaces between said upper runs in a region closely adjacent the location of said support but spaced therefrom in the direction of movement of said upper runs.

10. The mechanism of claim 9 including means for establishing a cushioning flow of fluid upwardly through the openings in said platform.

References Cited in the file of this patent

UNITED STATES PATENTS

| | | |
|---|---|---|
| 2,645,329 | Blair | July 14, 1953 |
| 2,662,633 | Kingsley | Dec. 15, 1953 |
| 2,667,259 | Parker | Jan. 26, 1954 |
| 2,718,958 | Steen | Sept. 27, 1955 |

FOREIGN PATENTS

| | | |
|---|---|---|
| 90,083 | Norway | Aug. 3, 1957 |